(12) United States Patent
Shen et al.

(10) Patent No.: US 8,550,723 B2
(45) Date of Patent: Oct. 8, 2013

(54) OPTICAL FIBER CONNECTOR

(75) Inventors: Po-Hsun Shen, Taipei Hsien (TW); Bing Su, Shenzhen (CN); Shao-You Han, Shenzhen (CN); Xiao-Bo Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 361 days.

(21) Appl. No.: 12/961,670

(22) Filed: Dec. 7, 2010

(65) Prior Publication Data
US 2011/0176775 A1   Jul. 21, 2011

(30) Foreign Application Priority Data
Jan. 21, 2010 (CN) .......................... 2010 1 0300560

(51) Int. Cl.
*G02B 6/38* (2006.01)
(52) U.S. Cl.
USPC .................. 385/56; 385/53; 385/54; 385/55; 385/58; 385/60; 385/62; 385/99

(58) Field of Classification Search
None
See application file for complete search history.

(56) References Cited

U.S. PATENT DOCUMENTS

| | | | |
|---|---|---|---|
| 4,946,249 A | 8/1990 | Barlow et al. | |
| 5,341,448 A * | 8/1994 | Huebscher | 385/97 |
| 7,220,061 B2 * | 5/2007 | De Marchi | 385/76 |

FOREIGN PATENT DOCUMENTS

CN   101498817 A   8/2009

* cited by examiner

*Primary Examiner* — Uyen Chau N Le
*Assistant Examiner* — Chad Smith
(74) *Attorney, Agent, or Firm* — Altis & Wispro Law Group, Inc.

(57) ABSTRACT

An optical fiber connector includes a first protecting body and a second protecting body detachably assembled to the first protecting body. The first protecting body includes a first base plate and a first housing extending out from the first base plate. The first base plate defines a first receiving hole to communicate with the first housing. The second protecting body includes a second base plate and a second housing extending out from the second base plate. The second base plate defines a second receiving hole to communicate with the second housing. The second housing and the first housing together define an accommodating space therebetween.

20 Claims, 6 Drawing Sheets

OPTICAL FIBER CONNECTOR

BACKGROUND

1. Technical Field

The present disclosure relates to an optical fiber connector.

2. Description of Related Art

Optical fiber connectors or mating sleeves are widely used to protect and enclose the junctions of two optical fiber cables. However, a commonly used optical fiber connector or mating sleeve has a complex structure and is difficult to assemble, and also requiring dedicated tools and complicated operation.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the optical fiber connector. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
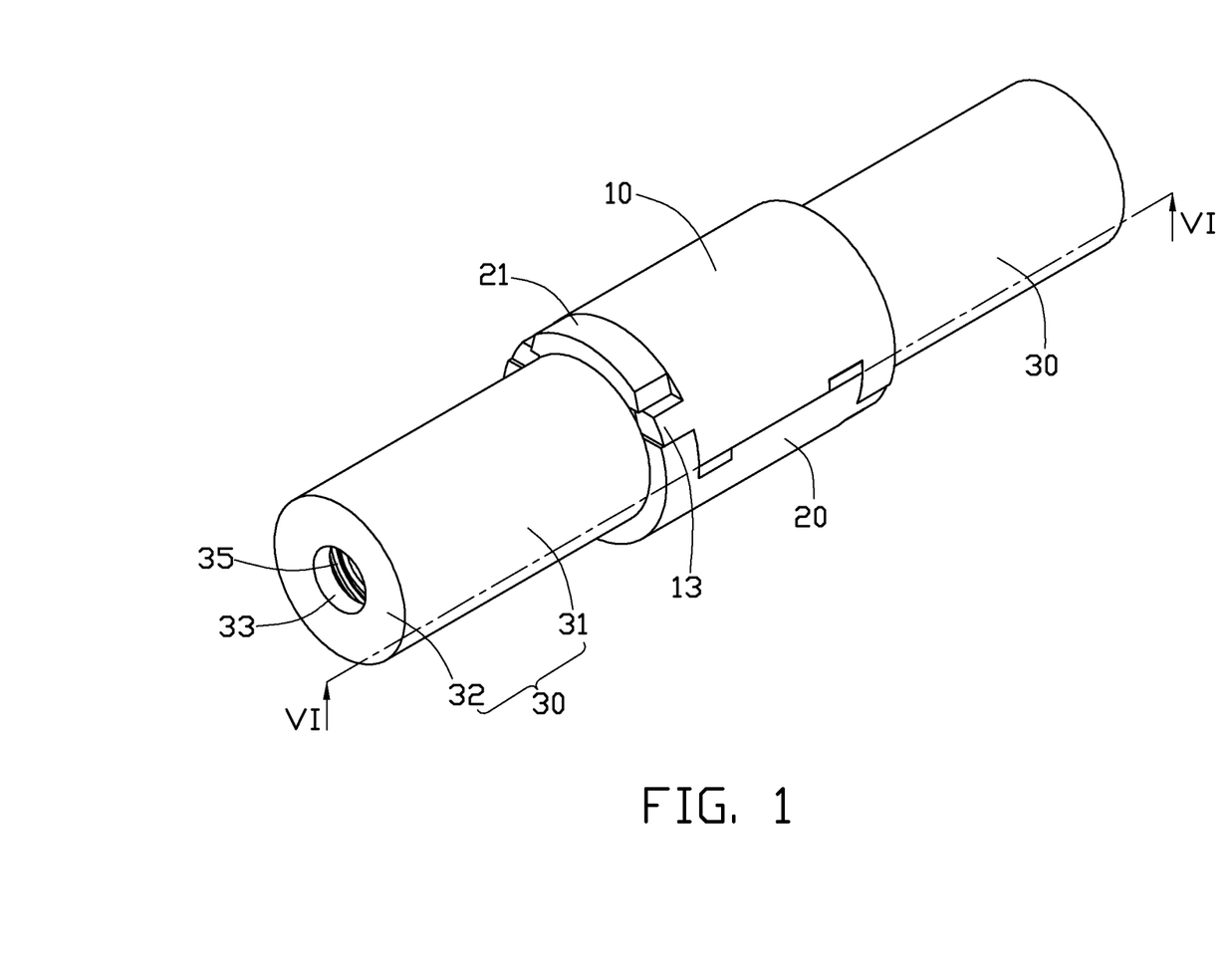
FIG. 1 is an assembled isometric view of an embodiment of an optical fiber connector including a first main body, a second main body and two fasteners.
Figure 2:
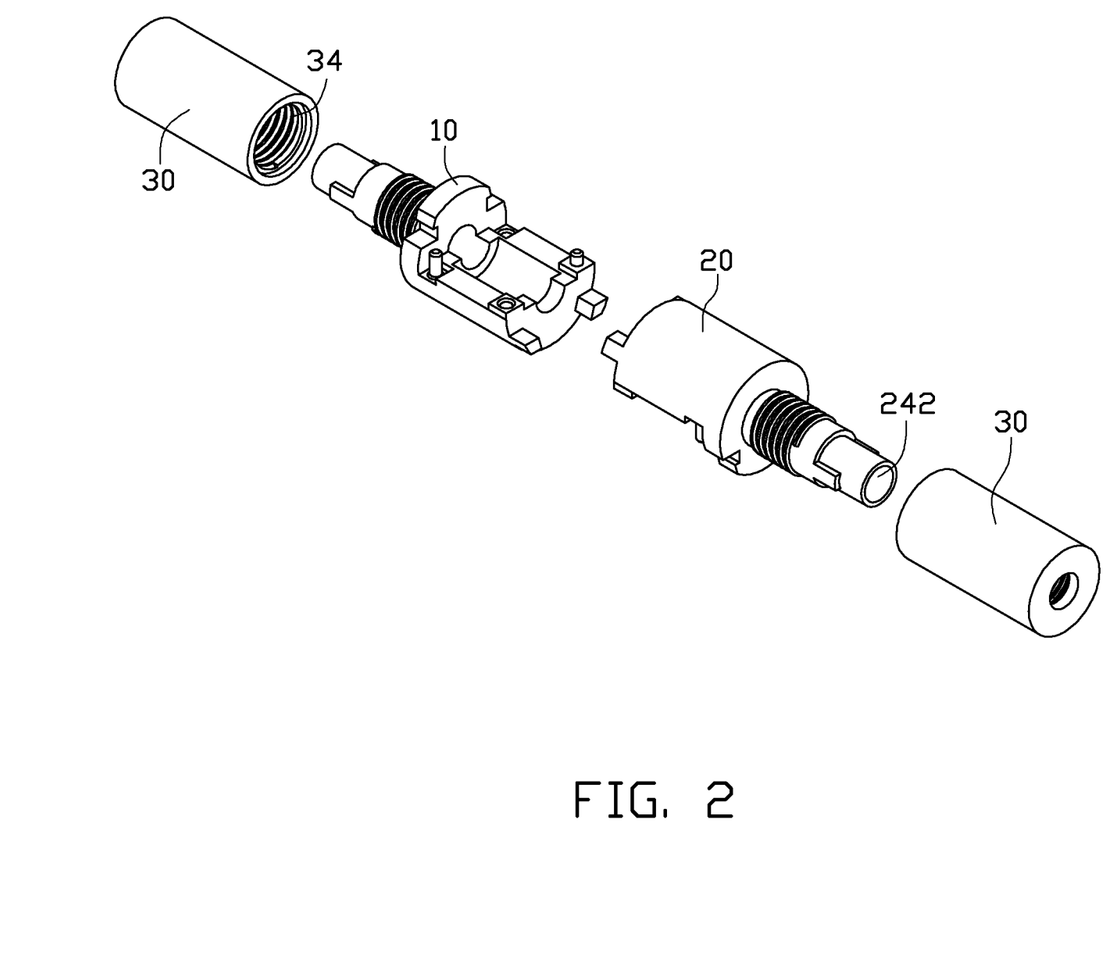
FIG. 2 is an exploded isometric view of the optical fiber connector shown in FIG. 1.

Referring to FIGS. 1 and 2, an embodiment of an optical fiber connector 100 includes a first protecting body 10, a second protecting body 20 and two fixing pieces 30. The first protecting body 10 and the second protecting body 20 are detachably assembled, and forming an accommodating space (not shown) therein for receiving the mating together of two optical fiber cables (not shown). The two fixing pieces 30 are detachably fixed to the distal ends of the first protecting body 10 and the second protecting body 20, respectively, for fixing the corresponding optical fiber cables.

Figure 3:
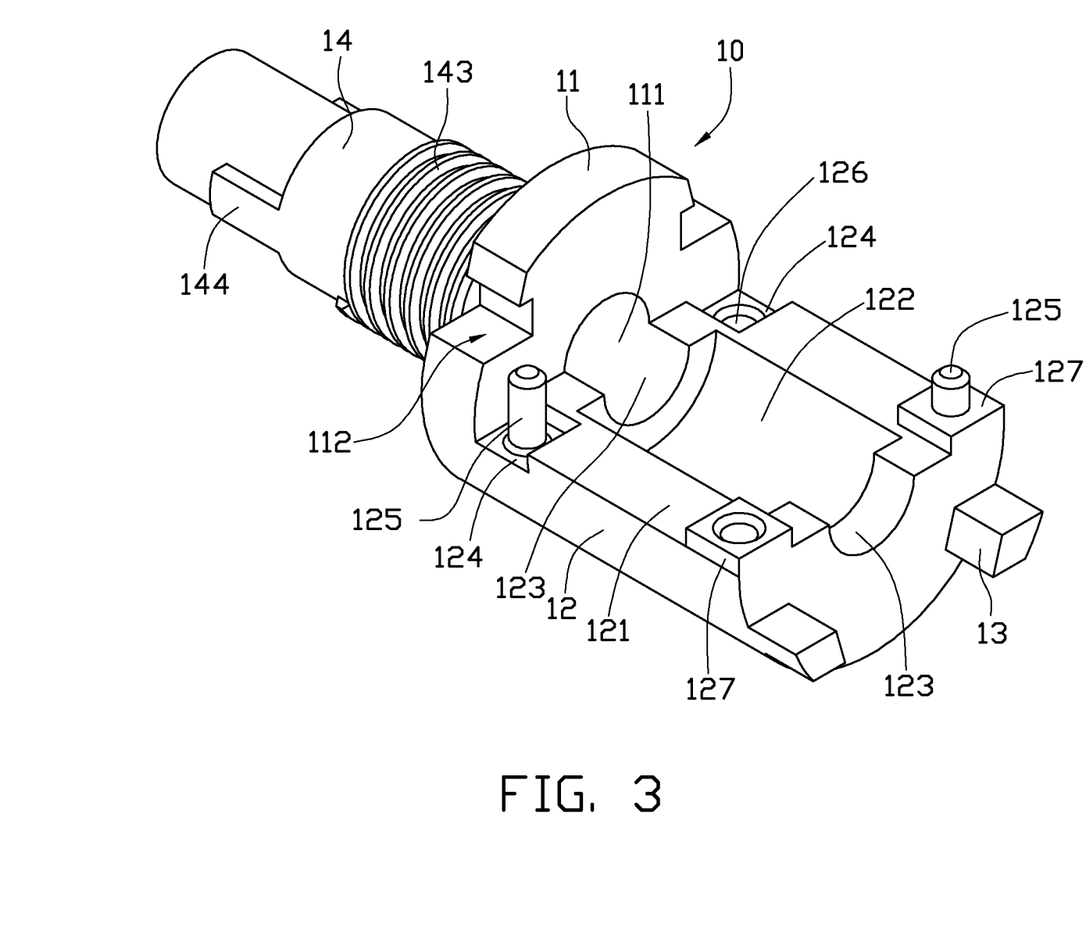
FIG. 3 is an enlarged perspective view of the first main body shown in FIG. 2.

Also referring to FIG. 3, the first protecting body 10 includes a first base plate 11, a first housing 12, at least one first latching portion 13 and a first fixing portion 14. In the illustrated embodiment, the first base plate 11 is substantially disk-shaped and defines a first receiving hole 111 through a substantially central portion of the first base plate 11. At least one first latching slot 112 is defined through the first base plate 11 and positioned adjacent to a peripheral edge of the first base plate 11. In the illustrated embodiment, two first latching slots 112 are defined through the first base plate 11 at opposite sides.

The first housing 12 extends out from one side of the first base plate 11 perpendicularly. In the illustrated embodiment, the first housing 12 is substantially hemispherical in cross-section and positioned coaxial with the first base plate 11. The first housing 12 includes a first resisting surface 121 substantially perpendicular to the first base plate 11 and is coplanar with the axes of the first receiving hole 111 of the first base plate 11. A first accommodating slot 122 is defined in the substantially central portion of the first resisting surface 121 for accommodating the mating together of the two optical fiber cables. In the illustrated embodiment, the first accommodating slot 122 is substantially hemispherical in cross-section and coaxial with the first receiving hole 111 of the first base plate 11. Two first guiding slots 123 are respectively defined in the two ends of the first resisting surface 121 to communicate with the first accommodating slot 122. Both of the two first guiding slots 123 are substantially hemispherical in cross-section in the illustrated embodiment. One of the first guiding slots 123 is positioned adjacent to the first base plate 11 to communicate coaxially with the first receiving hole 111.

Two first locating grooves 124 are defined in one end of the first resisting surface 121 of the first housing 12 adjacent to the first base plate 11 and positioned at two sides of the corresponding first guiding slot 123. Two first locating protrusions 127 are respectively formed at two sides of the other end of the first resisting surface 121 opposite to the corresponding two first locating grooves 124. Two first locating posts 125 are respectively formed at the two diagonal corners of the first resisting surface 121 of the first housing 12. In the illustrated embodiment, one first locating post 125 extends from one corresponding first locating groove 124, and the other first locating post 125 extends from the corresponding first locating protrusion 127 located diagonally. Two first locating holes 126 are respectively defined in the other two diagonal corners of the first resisting surface 121. In the illustrated embodiment, one first locating hole 126 is defined in the other first locating protrusion 127, and the other first locating hole 126 is defined in the other first locating groove 124 located diagonally.

The at least one first latching portion 13 is substantially block-shaped and formed at an end surface of the first housing 12 away from the first base plate 11. In the illustrated embodiment, two first latching portions 13 extend from the end surface of the first housing 12 away from the first base plate 11 and positioned adjacent to two opposite peripheral edges thereof.

The first fixing portion 14 is substantially cylindrical and formed at the other side of the first base plate 11. The first fixing portion 14 defines a first receiving hole 142 (shown in FIG. 4) therethrough to communicate axially with the first receiving hole 111 of the first base plate 11. The diameter of the first receiving hole 142 is substantially the same as that of the first receiving hole 111 of the first base plate 11. The first fixing portion 14 defines a plurality of outside threads 143 thereon adjacent to the first base plate 11. Two latching ribs 144 are formed on the outer peripheral wall of the first fixing portion 14 adjacent to the distal end thereof.

Figure 4:
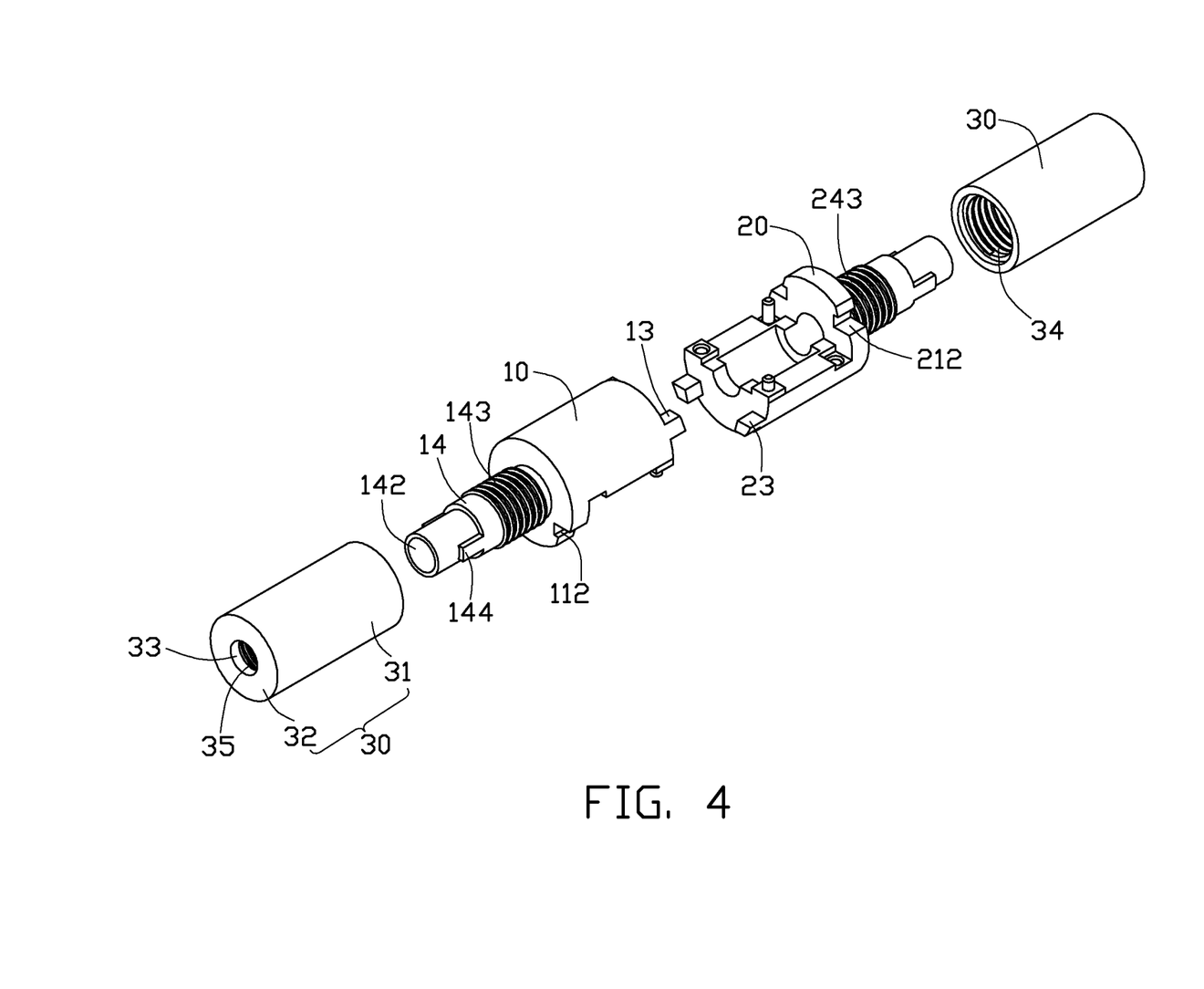
FIG. 4 is similar to FIG. 2, but viewed from another aspect.
Figure 5:
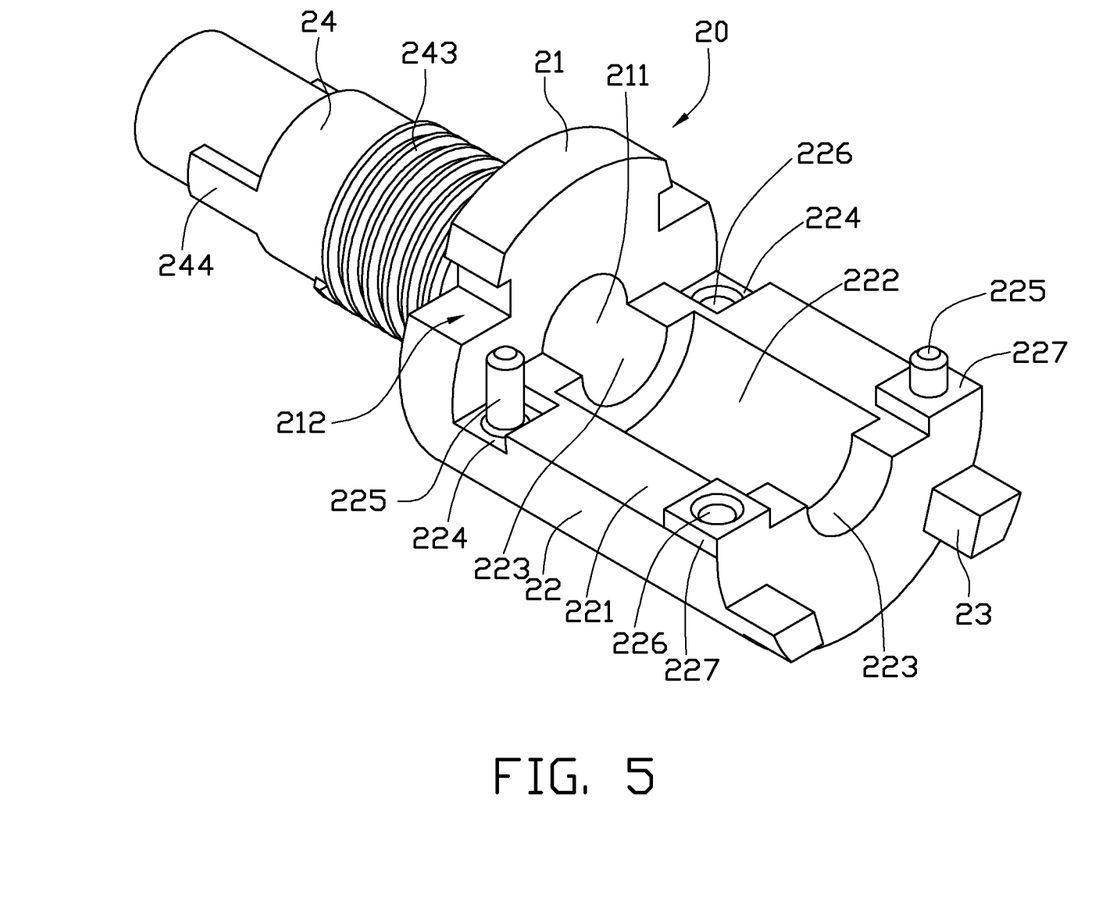
FIG. 5 is an enlarged perspective view of the second main body shown in FIG. 2.

Also referring to FIGS. 4 and 5, the second protecting body 20 has substantially the same shape as the first protecting body 10. The second protecting body 20 includes a second base plate 21, a second housing 22, at least one second latching portion 23 and a second fixing portion 24. In the illustrated embodiment, the second base plate 21 is substantially disk-shaped and defines a second receiving hole 211 corresponding to the first receiving hole 111 of the first base plate 11, as the first protecting body 10 and the second protecting body 20 are assembled together, the second receiving hole 211 is coaxial with the corresponding first receiving hole 111 of the first base plate 11.

At least one second latching slot 212 is defined through the second base plate 21 and positioned adjacent to a peripheral edge of the second base plate 21. In the illustrated embodiment, two second latching slots 212 are oppositely defined through the second base plate 21 corresponding to the two first latching portions 13 of the first protective body 10. The second housing 22 includes a second resisting surface 221, a second accommodating slot 222 defined in the second resisting surface 221, and two second guiding slots 223 respectively defined in the two ends of the second resisting surface 221. The second housing 22 further includes two second locating grooves 224 defined in one end of the second resisting surface 221 adjacent to the second base plate 21 corresponding to the two first locating protrusions 127 of the first protecting body 10. Two second locating protrusions 227 are respectively formed at two sides of the other end of the second resisting surface 221 corresponding to the two first locating grooves 124. Two second locating posts 225 are respectively formed at the two diagonal corners of the second resisting surface 221 of the second housing 22 corresponding to the two first locating holes 126 of the first housing 12. Two second locating holes 226 are respectively defined in the other two diagonal corners of the second resisting surface 221 corresponding to the two first locating posts 125 of the first housing 12.

The at least one second latching portion 23 is formed at an end surface of the second housing 22 away from the second base plate 21, corresponding to the at least one first latching slot 112 of the first base plate 11. In the illustrated embodiment, two second latching portions 23 extend from the end surface of the second housing 22 away from the second base plate 21 and positioned adjacent to two opposite peripheral edges thereof corresponding to the two latching slots 112 of the first base plate 11, such that, as the first protecting body 10 and the second protecting body 20 are assembled together, the two second latching portions 23 are received in the corresponding two first latching slots 112 of the first base plate 11.

The second fixing portion 24 is substantially cylindrical and formed at the other side of the second base plate 21. The second fixing portion 24 defines a second receiving hole 242 (shown in FIG. 2) therethrough communicating axially with the second receiving hole 211 of the second base plate 21. The second fixing portion 24 includes a plurality of outside threads 243 defined thereon adjacent to the second base plate 21. Two latching ribs 244 are formed on the outer peripheral wall of the second fixing portion 24 adjacent to the distal end thereof.

The fixing piece 30 is substantially cylindrical and includes a sleeve portion 31 and a semi-closed end 32 formed at a distal end of the sleeve portion 31, and the semi-closed end 32 is defining a connecting hole 33. The sleeve portion 31 has an inner diameter substantially the same as the outer diameter of the first and second fixing portions 14, 24, respectively. The sleeve portion 31 defines a first inside thread 34 away from the semi-closed end 32 thereof, corresponding to the first outside thread 143 of the first fixing portion 14 and the second outside thread 243 of the second fixing portion 24. A second inside thread 35 is defined adjacent to the semi-closed end 32 of the fixing piece 30.

During assembly of the optical fiber connector 100, the two first latching portions 13 of the first protecting body 10 align with and are received in the corresponding two second latching slots 212 of the second protecting body 20. Meanwhile, the two second latching portions 23 of the second protecting body 20 are received in the corresponding two first latching slots 112 of the first protecting body 10. The first resisting surface 121 resists the second resisting surface 221. The two second locating protrusions 227 of the second protecting body 20 are respectively received in the corresponding two first locating grooves 124 of the first protecting body 10, with the second locating post 225 and the second locating hole 226 thereof engaging the corresponding first locating hole 126 and the first locating post 125, respectively. Correspondingly, the two first locating protrusions 127 of the first protecting body 10 are respectively received in the corresponding two second locating grooves 224 of the second protecting body 20, with the first locating post 125 and the first locating hole 126 thereof engaging the corresponding second locating hole 226 and the second locating post 225, respectively. Thus, the first protecting body 10 is assembled to the second protecting body 20. The first accommodating slot 122 of the first protecting body 10 and the second accommodating slot 222 of the second protecting body 20 cooperatively form the accommodating space for receiving the mating together of two optical fiber cables. The two fixing pieces 30 are respectively sleeved on and threaded on the first fixing portion 14 of the first protecting body 10 and the second fixing portion 24 of the second protecting body 20 to complete the assembly of the optical fiber connector 100 (shown in FIG. 1).

Figure 6:
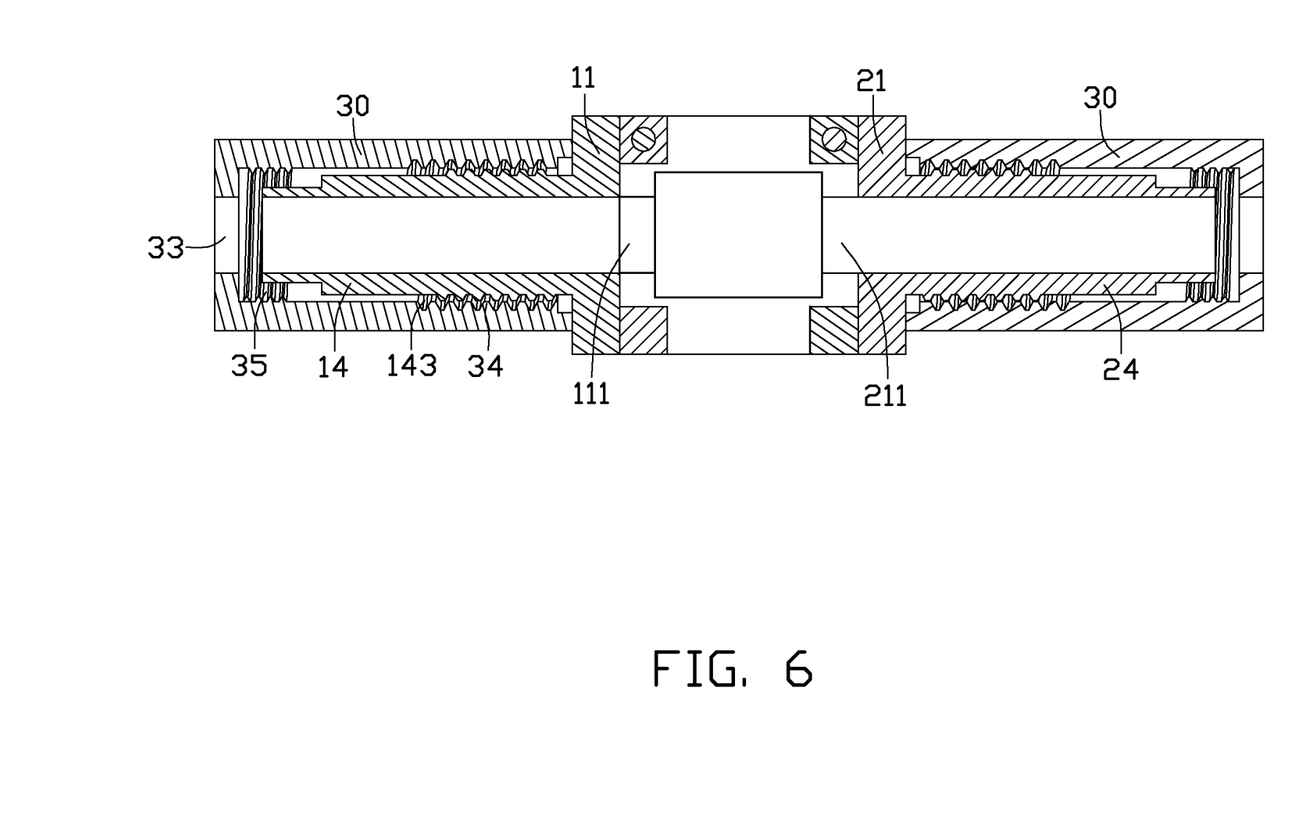
FIG. 6 is a cross-section of the optical fiber connector taken along line VI-VI of FIG. 1.

Referring to FIG. 6, in use, the optical fiber connector 100 connects two optical fiber cables (not shown) together to envelop or form a sleeve around for the mating together of the two optical fiber cables therein. The two optical fiber cables pass through the first receiving hole 142 of the first protecting body 10 and the second receiving hole 242 of the second protecting body, respectively, and are exposed from the corresponding first receiving hole 111 of the first base plate 11 and the second receiving hole 211 of the second base plate 21. The two optical fiber cables are connected together thereby forming a mated fiber link therebetween. After that, the first protecting body 10 and the second protecting body 20 are assembled as described, with the mating together thereof received within the accommodating space formed by the first protecting body 10 and the second protecting body 20. Finally, the two fixing pieces 30 are sleeved and threaded on the first fixing portion 14 of the first protecting body 10 and the second fixing portion 24 of the second protecting body 20, respectively, to fix and secure the optical fiber cables, thus, the two optical fiber cables are firmly connected together by means of the optical fiber connector 100.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An optical fiber connector, comprising:
a first protecting body, the first protecting body comprising a first base plate, a first housing, and at least one first latching portion, the first housing perpendicularly extending out from the first base plate, the at least one first latching portion perpendicularly protruding from an end of the first housing opposite to the first base plate, the first housing comprising a first resisting surface substantially perpendicular to the first base plate, two first locating protrusions perpendicularly extending from the first resisting surface, the first base plate defining a first receiving hole to communicate with the first housing; and
a second protecting body, the second protecting body detachably assembled to the first protecting body, the second protecting body comprising a second base plate, a second housing extending out from the second base plate, the second housing comprising a second resisting surface substantially perpendicular to the second base plate, the second resisting surface defines two second locating grooves at an end adjacent to the second base plate, the second base plate defining a second receiving hole to communicate with the second housing and at least one second latching slot; the second housing and the first housing cooperatively forming an accommodating space therebetween, wherein an extending direction of the first latching portion is perpendicular to an extending direction of the first locating protrusions, the at least one first latching portion is detachably latched with the at least one second latching slot, the two first locating protrusions are respectively detachably engaged with the two second locating grooves.

2. The optical fiber connector of claim 1, wherein the first protecting body further comprises at least one first latching slot defined through the first base plate; the at least one second latching slot is defined through the second base plate corresponding to the at least one first latching portion, the second protecting body further comprises at least one second latching portion formed on the second housing, the at least one second latching portion detachably latches into the corresponding at least one first latching slot.

3. The optical fiber connector of claim 2, wherein the first housing further comprises a first accommodating slot defined in the first resisting surface, the second housing further comprises a second accommodating slot defined in the second resisting surface, the second resisting surface resists the first resisting surface, and the first accommodating slot and the second accommodating slot cooperatively form the accommodating space.

4. The optical fiber connector of claim 3, wherein the first accommodating slot and the second accommodating slot are both substantially hemispherical in cross section and coaxial with the first and second receiving hole.

5. The optical fiber connector of claim 3, wherein the first resisting surface further comprises two first guiding slots respectively defined in two ends thereof to communicate with the first accommodating slot, and one of the first guiding slots communicates with the first receiving hole.

6. The optical fiber connector of claim 5, wherein the second resisting surface further comprises two second guiding slots respectively defined in two ends thereof to communicate with the second accommodating slot, one of the second guiding slots communicates with the second receiving hole, such that the first and second receiving holes both communicate with the accommodating space via the first and second guiding slots.

7. The optical fiber connector of claim 3, wherein the first resisting surface further defines two first locating grooves adjacent to the first base plate and positioned at two sides of the corresponding one first guiding slot; the second housing further comprises two second locating protrusions respectively formed at two sides of the distal end of the second resisting surface; the two second locating protrusions engage with the corresponding two first locating grooves of the first housing.

8. The optical fiber connector of claim 7, wherein the two first locating protrusions are formed at two sides of the other end of the first resisting surface opposite to the corresponding two first locating grooves.

9. The optical fiber connector of claim 3, wherein the first housing further comprises two first locating posts respectively formed at two diagonal corners of the first resisting surface, the second housing further defines two second locating holes respectively defined in two diagonal corners of the second resisting surface corresponding to the two first locating posts of the first housing; the two first locating posts respectively engage with the corresponding two second locating holes.

10. The optical fiber connector of claim 2, wherein the first protecting body further comprises a first fixing portion formed at a side of the first base plate opposite to the first housing; the first fixing portion defines a first receiving hole communicating axially with the first receiving hole of the first base plate;

the second protecting body further comprises a second fixing portion formed at a side of the second base plate opposite to the second housing; the second fixing portion defines a second receiving hole communicating axially with the second receiving hole of the second base plate.

11. The optical fiber connector of claim 10, wherein the optical fiber connector further comprises two fixing pieces, and the two fixing pieces are respectively detachably fixed to the first and second fixing portions.

12. The optical fiber connector of claim 10, wherein each of the first and second fixing portion defines an outside thread thereon adjacent to the corresponding first and second base plates; each of the first and the second fixing pieces is a substantially hollow cylinder and comprises a sleeve portion defining an inside thread corresponding to the first and second outside threads; the first and the second fixing pieces are threaded on the first and the second fixing portions of the first and the second protecting bodies, respectively.

13. An optical fiber connector, comprising:
a first protecting body, the first protecting body comprising:
a first base plate defining a first receiving hole;
a first housing perpendicularly extending out from one side of the first base plate and defining a first accommodating slot to communicate with the first receiving hole, the first housing comprising a first resisting surface substantially perpendicular to the first base plate, two first locating protrusions perpendicularly extending from the first resisting surface; and
at least one latching portion perpendicularly protruding from an end of the first housing opposite to the first base plate; and
a second protecting body detachably assembled to the first protecting body, the second protecting body comprising:
a second base plate defining a second receiving hole;
a second housing extending out from the second base plate and defining a second accommodating slot to communicate with the second receiving hole, the second housing comprising a second resisting surface substantially perpendicular to the second base plate, the second resisting surface defines two second locating grooves at an end adjacent to the second base plate; and
at least one latching slot defined through the second base plate; the first accommodating slot of the first housing and the second accommodating slot of the second housing cooperatively forming an accommodating space; the at least one latching portion detachably engaging the corresponding at least one latching slot,
wherein an extending direction of the first latching portion is perpendicular to an extending direction of the first locating protrusions, the two first locating protrusions respectively are detachably engaged with the two second locating grooves.

14. The optical fiber connector of claim 13, wherein the first protecting body further comprises a first fixing portion formed at the other side of the first base plate opposite to the first housing; the first fixing portion defines a first receiving hole communicating axially with the first receiving hole of the first base plate;

the second protecting body further comprises a second fixing portion formed at the other side of the second base plate opposite to the second housing; the second fixing portion defines a second receiving hole communicating axially with the second receiving hole of the second base plate.

15. The optical fiber connector of claim 14, wherein the optical fiber connector further comprises two fixing pieces, each fixing piece is substantially a hollow cylinder and includes a sleeve portion and a semi-closed end formed at a distal end of the sleeve portion, the semi-closed end defining a connecting hole, and the two fixing pieces are detachably fixed to the first and second fixing portion, respectively.

16. The optical fiber connector of claim 15, wherein the first and second fixing portion each defines a plurality of outside threads, and comprises two latching ribs formed adjacent to the distal end thereof; the sleeve portion defines an inside thread away from the semi-closed end, corresponding to the outside threads of the first and the second fixing portion.

17. The optical fiber connector of claim 14, wherein the first accommodating slot is defined in the first resisting surface, the second accommodating slot is defined in the second resisting surface, and the second resisting surface resists the first resisting surface.

18. The optical fiber connector of claim 17, wherein the first and second accommodating slots are both substantially hemispherical in cross section and coaxial with the first and second receiving hole.

19. The optical fiber connector of claim 17, wherein the first resisting surface further comprises two first guiding slots respectively defined in two ends thereof to communicate with the first accommodating slot, one of the first guiding slots communicates with the first receiving hole; the second resisting surface further comprises two second guiding slots respectively defined in two ends thereof to communicate with the second accommodating slot, one of the second guiding slots communicates with the second receiving hole, such that the first and second receiving holes both communicate with the accommodating space via the first and second guiding slots.

20. The optical fiber connector of claim 17, wherein the first housing further comprises two first locating posts respectively formed at two diagonal corners of the first resisting surface, the second housing further defines two second locating holes respectively defined in two diagonal corners of the second resisting surface corresponding to the two first locating posts of the first housing; the two first locating posts respectively engage with the corresponding two second locating holes.

* * * * *